Figure 1:
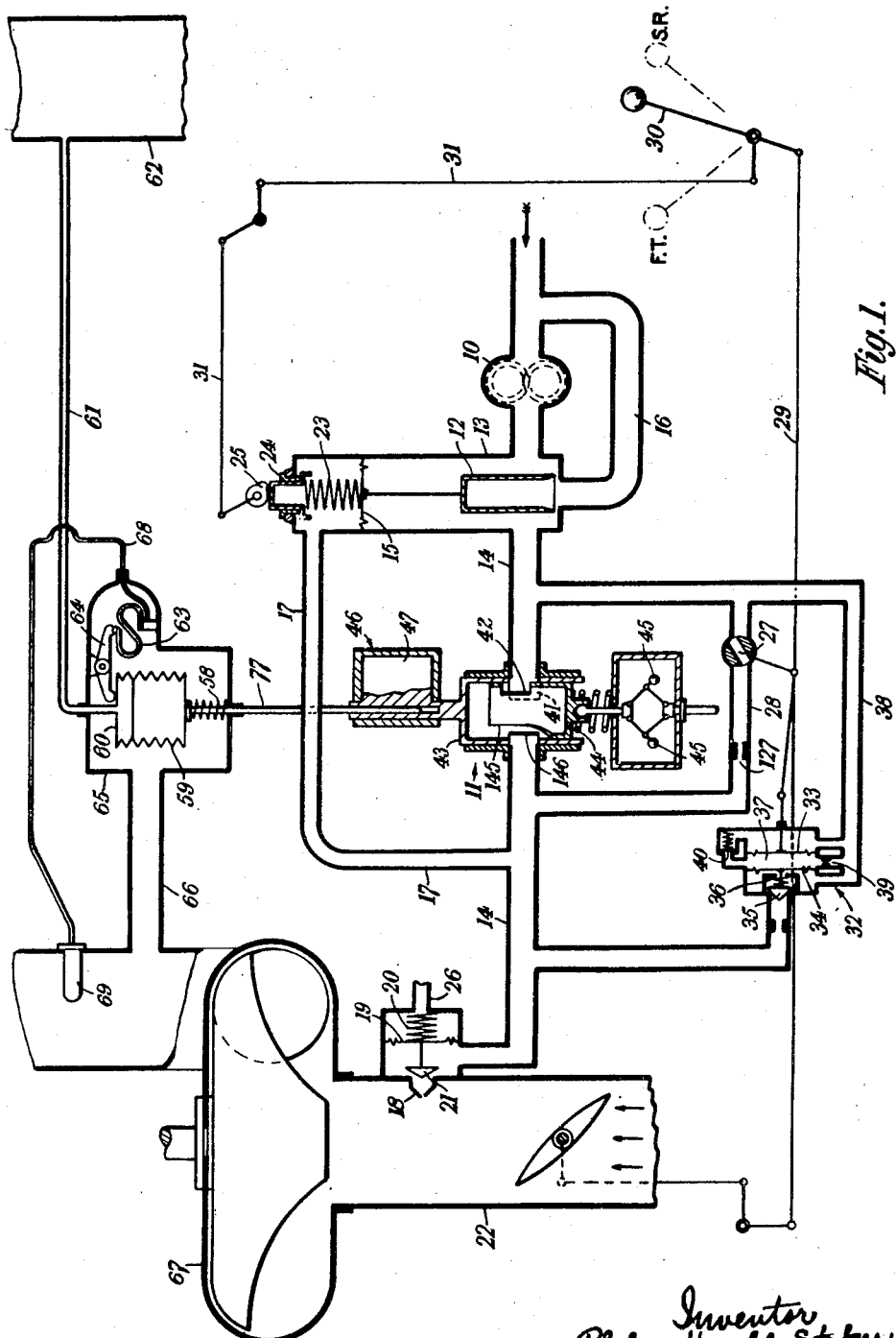

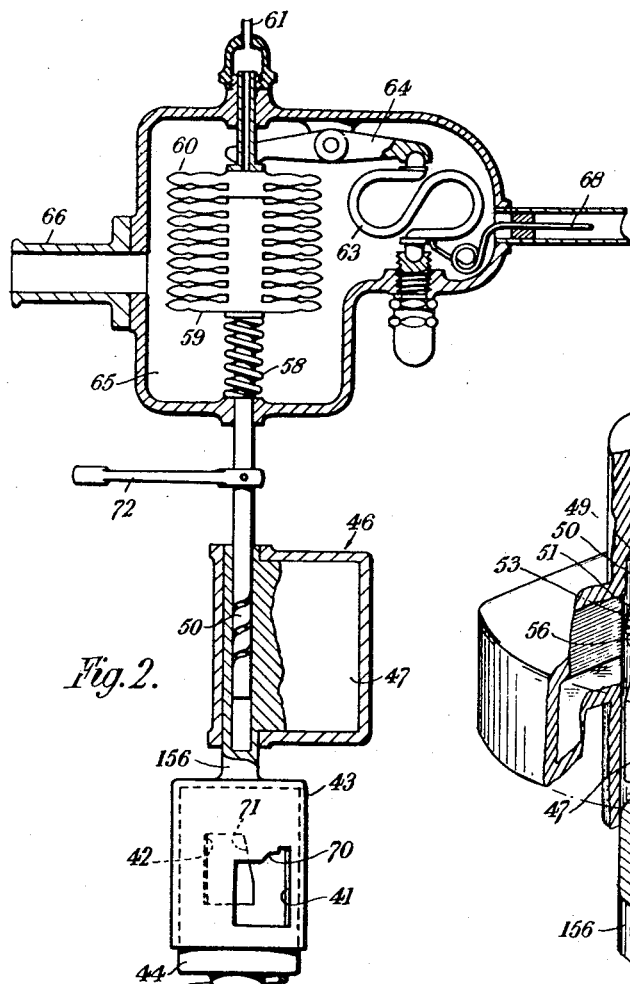
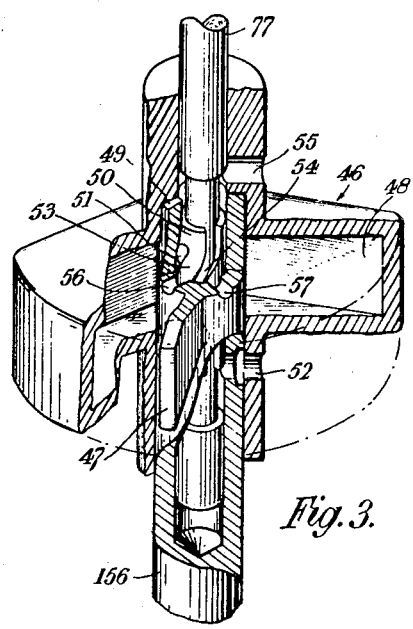
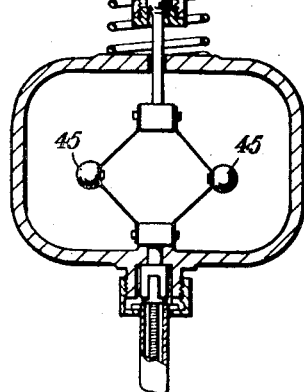
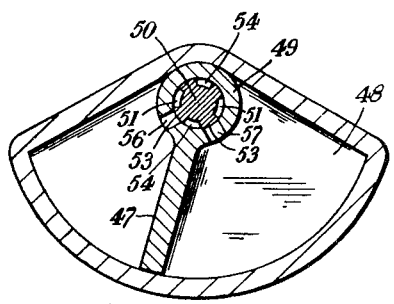
Fig. 2.
Fig. 3.
Fig. 4.

Patented June 24, 1947

2,422,808

UNITED STATES PATENT OFFICE 2,422,808

REGULATING DEVICE FOR CONTROLLING THE SUPPLY OF FUEL AND OTHER LIQUIDS TO INTERNAL-COMBUSTION ENGINES

Philip Harold Stokes, Stratford-on-Avon, England, assignor to H. M. Hobson Limited, London, England Application June 27, 1944, Serial No. 542,266
In Great Britain June 22, 1943

14 Claims. (Cl. 123—119)

A fuel-metering device for internal combustion engines is known in which, as described in my earlier United States application No. 494,514, now Patent Number 2,374,844, the rate of flow of fuel to the engine is, for a given induction pipe pressure and induction temperature, made a desired function of engine speed by applying across a fuel-metering orifice, to which the fuel is fed by a main fuel-pump, some fraction of the pressure difference developed by an engine-driven centrifugal impeller. In this device, the rate of flow of fuel is also adjusted to suit changes in induction pipe pressure, induction temperature and exhaust back pressure by automatic variation in the effective area of the metering orifice under the control of these factors.

It has been found that with a fuel-metering device of this character difficulties are liable to arise owing to air locks, and that to eliminate this, it is necessary to provide for a backward flow of fuel through the centrifugal impeller to the suction side of the main pump, which backward flow in turn, leads to difficulties due to hydraulic losses in the lines and also destroys to a large extent the suction characteristics of the main pump. Also, the variations in engine speed under different conditions of operation are very substantial, e. g. from 500 to 4,000 revs. per minute, and as the pressure difference developed by the impeller is proportional to the square of the engine speed, the pressure difference which can be developed across the orifice at slow running, will necessarily be comparatively small so that the presence of air or vapour bubbles in the lines may introduce a considerable error in the metering pressure and therefore the metered fuel flow under these conditions.

According to the invention, I adjust the fuel flow to suit variations in engine speed by varying the effective area of the metering orifice as a desired function of engine speed. This enables us to employ a constant pressure difference across the metering orifice, thus avoiding the above-mentioned disadvantages, as the adjustment in the fuel flow to suit other variable factors, such as induction pipe pressure, induction temperature or exhaust back pressure, can be made by varying the effective area of the orifice under the control of these factors as well as of engine speed. I do not, however, exclude in suitable cases compensating the fuel flow to suit variation in such factors by arranging for a corresponding variation in the pressure difference across the orifice.

By the expression "a desired function" of engine speed, I mean that the effective area of the metering orifice is adjusted in such a way as to vary the rate of flow of fuel in relation to engine speed as required by the particular engine to which the metering device is to be fitted.

I prefer to keep the pressure difference constant, and to apply all the required corrections to the area of the orifice. Even where the pressure difference is varied to suit changes in induction pressure and like factors, I obtain however a considerable advantage over the known metering device described above, because the complication of the impeller is eliminated and the variations in pressure difference will be much smaller than those which arise when the pressure difference is made a function of engine speed. Thus, in the case of an aircraft engine the ratio of the pressure differences corresponding to maximum and minimum boost will be of the order of 5 to 1, whereas if the pressure difference is made responsive to engine speed, the ratio may be of the order of 64 to 1.

A preferred form of fuel-metering device for an internal combustion engine according to the invention comprises a fuel-metering orifice, a pump for feeding fuel to the engine through the orifice, means for establishing across the orifice a pressure difference which remains constant under all conditions of engine loading, means for varying the effective area of the metering orifice as a desired function of engine speed, and means for providing a further variation in the effective area of the metering orifice in accordance with changes in one or more other factors to which the fuel flow requires to be related e. g. induction pipe pressure, induction temperature, or exhaust back pressure.

By maintaining the pressure difference across the orifice constant, I not only, as already explained, avoid the complication resulting from the use of the centrifugal impeller, but am enabled to select a pressure difference which will be sufficiently large on the one hand to give good controllability at slow running, while sufficiently small on the other hand to permit of the use of a relatively large orifice at the higher power conditions of engine running. The advantage of having a relatively large pressure difference at slow-running is that the effect of unpredictable disturbing effects such as the presence of air or vapour bubbles in the fuel causing small variations in pressure, will be greatly reduced, and a large orifice for the high power conditions is of advantage as this facilitates the shaping of the orifice to vary the mixture strength for different conditions of operation as later described.

It will be appreciated that, with a system of this kind, the variations in rate of flow of fuel required to suit various engine speeds and different conditions imposed by the other factors, such as induction pipe pressure and temperature and exhaust back pressure, are all provided by the changes in effective area of the orifice. It is sometimes, especially in the case of aircraft engines, desirable to superimpose on these general variations, local variations in mixture strength such as a change from "weak" to "normal" cruising mixture; and an enrichment for climbing and take-off. Such variations in mixture strength can, as already indicated, be provided by suitable shaping of the metering orifice. In suitable cases, however, I may superimpose them on the system by providing an appropriate variation in the pressure difference across the metering orifice. Despite this variation, the pressure difference will still be constant in the sense that it is not directly affected by engine speed, but is only subjected, under the control of a member such as the pilot's throttle lever, to the comparatively small variation (e. g. of the order of 40%) necessary to adjust the mixture strength to conditions of cruising, climbing and take-off.

In some cases it is required to feed other liquids besides fuel to an internal combustion engine in a determined relation to the air which varies with engine speed and other factors, e.g. methanol and water to avoid detonation, and the expression "fuel" as used herein, is to be understood as including, where appropriate, such other liquids.

Figure 5:
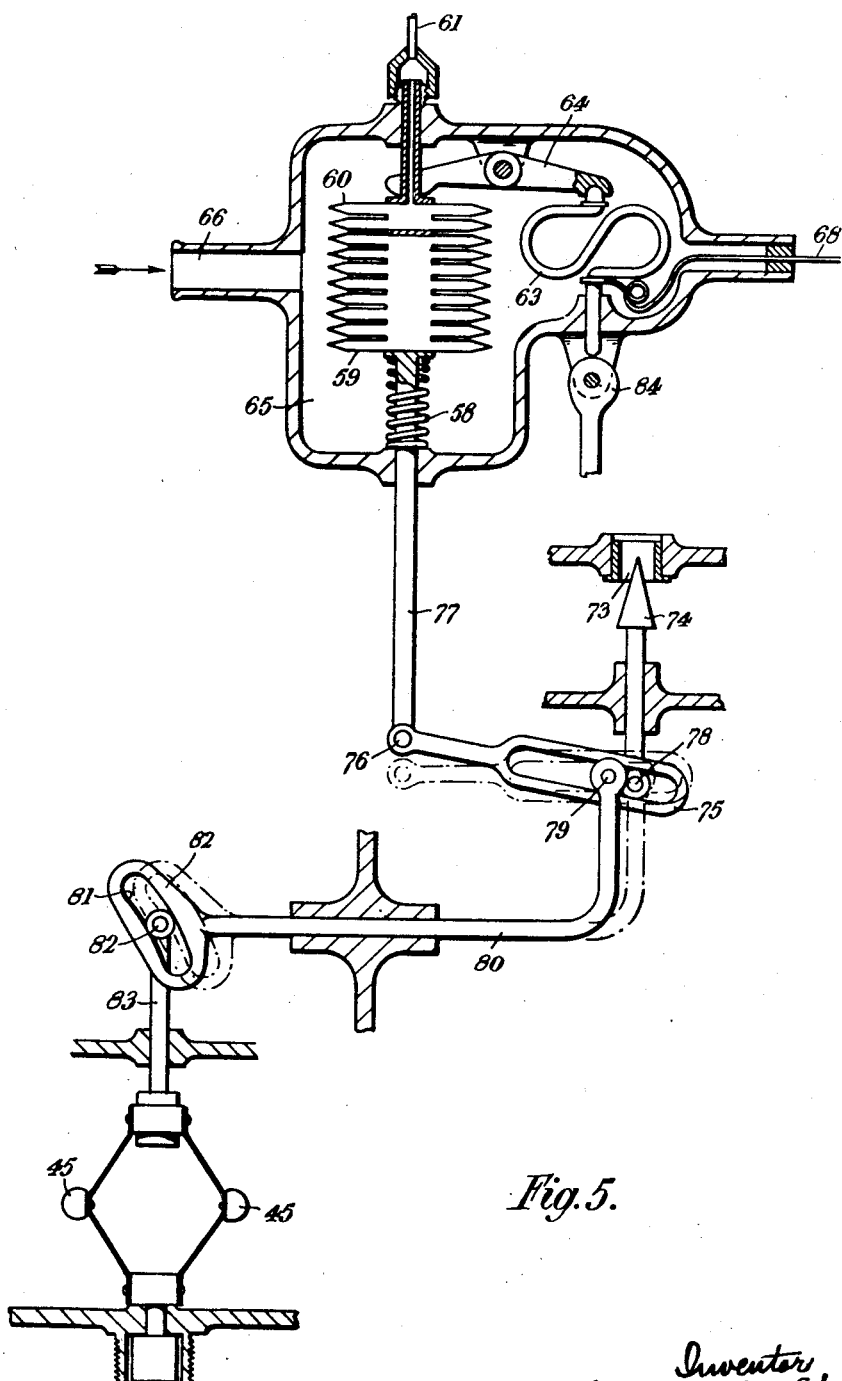

Certain specific forms of fuel-metering device for aircraft engines according to the invention will now be described in detail, by way of example, with reference to the accompanying drawings, in which Fig. 1 is a diagrammatic view of one form of metering device according to the invention, with some of the parts broken away, Fig. 2 is an enlarged section through the metering orifice and the mechanism for varying its effective area, modified in certain respects as compared with the corresponding mechanism in Fig. 1, Fig. 3 is a perspective view of the vane type servo motor shown in Figs. 1 and 2, Fig. 4 is a horizontal section through the servo motor, and Fig. 5 is a view similar to Fig. 2, showing an alternative form of metering orifice and alternative mechanism for varying its effective area.

Like reference characters indicate like parts throughout the figures.

In the arrangement shown in Fig. 1, fuel is fed by an engine-driven pump 10, to a metering unit 11 defining, as hereinafter explained, a variable-area fuel-metering orifice, through a pressure-regulating valve 12. The fuel is fed by the pump 10 along a fuel pipe 14 to an injection nozzle 18, by which it is injected into the induction pipe 22. The regulating valve 12 is located in a chamber 13 constituting a local enlargement of the fuel pipe 14 and closed at the top end by a diaphragm 15 connected to the valve, and connected at the bottom end to a return passage 16, controlled by the valve and leading back to the suction side of the pump. The diaphragm 15 is thus exposed at its lower side to the pressure of the fuel surrounding the valve 12, which is substantially the pressure at the entry of the metering orifice. A branch pipe 17, leading off from the main fuel pipe, at a point intermediate between the exit side of the orifice and the nozzle 18, communicates with the upper side of the diaphragm 15. The upper side of the diaphragm is also loaded by a spring 23, the compression of which is adjustable by means of a screw 24 and from the datum thus obtained is further variable by a cam 25. The pressure of the fuel surrounding the regulating valve 12 is thus maintained at a predetermined value in excess of the pressure at the nozzle 18, and the pressure difference across the orifice is thus maintained constant, despite variations in the delivery of the pump, by the regulating valve 12 rising or falling and so controlling the quantity of fuel returned to the suction side of the pump by the return passage 16. The constant pressure difference across the orifice may, however, be increased or decreased by varying the compression of the diaphragm spring 23 by means of the cam 25.

The leak back to the suction side of the pump through the return passage 16 does not, as in the case of the known arrangement employing a centrifugal impeller, constitute a permanent leak which destroys the suction characteristics of the main pump. It is, on the contrary, a variable leak which remains closed when the pump is stationary and is only opened when the pump has generated sufficient pressure to lift the diaphragm 15 against its spring 23 and so open the regulating valve 12. By this time, however, the circuit is primed and the leak back to the suction side will not affect the suction characteristic of the pump.

The nozzle 18 is controlled by a valve 21 attached to a diaphragm 19, which is exposed at the side nearest the valve 21 to the fuel pressure at the entry to the nozzle, and at the other side to the pressure of a spring 20 and to a balancing pressure, e. g. atmospheric pressure or boost pressure, supplied through a pipe 26. The injection pressure is therefore maintained at a predetermined value above the balancing pressure.

Provision for adjustment of the mixture strength at slow running is made by incorporating a slow-runnning jet 127 and cut-off cock 27 controlling a pipe 28 in parallel with the variable metering orifice. This cock 27 is connected by a link 29 to the pilot's throttle lever 30 in order to cut out the slow-running jet at any desired position of the pilot's lever. In Fig. 1, S. R. represents the slow running position of the lever 30 and F. T. its full throttle position.

Adjustment of the mixture strength for other conditions, e. g. weak to normal cruising, take-off and climb, is effected by means of the cam 25 which is coupled to the pilot's lever 30 by a linkage 31. This cam could also, in suitable cases, provide the adjustment required at a slow-running, thus allowing the cut-off cock 27 to be dispensed with.

Acceleration is provided for by placing an accelerator pump 32 in parallel with the metering orifice. The accelerator pump is of the known type and comprises a pair of diaphragms 33, 34, the former connected to the pilot's lever 30 by the link 29 and the other connected to a valve 35 which is normally closed by a spring 36. When the pilot's lever 30 is moved to open the throttle, the diaphragm 33 is drawn to the right, and the depression produced in the space 37 between the two diaphragms causes the valve 35 to open, thus permitting extra fuel to flow to the engine through a pipe 38 until sufficient fuel has leaked into the space 37 through a leak 39 to permit the valve 35 to close again. When the pilot's lever 30 is moved to close the throttle excess fuel is spilled from the space 37 through a non-return valve 40.

The area of the metering orifice is varied as a function of engine speed, induction pipe pressure, induction temperature, and exhaust back pressure, as follows:

The metering orifice is constituted by the overlap between two ports 41, 42 of suitable form formed in a pair of nested cylindrical valves 43, 44. The inner valve 44 is arranged to execute a longitudinal movement, as the engine speed changes, under the control of governor weights 45, which are driven at some constant fraction of engine speed. The outer valve 43 is arranged to execute a rotary movement, as a result of changes in induction pipe presure, induction temperature and exhaust back pressure, by means of a vane type servo motor 46, as later described.

The ports 41, 42 in the two valves are so arrange that, at maximum speed, the whole length of the inner port 42 coincides with that of the outer port 41, while at maximum boost the outer port 41 is rotated so that its whole breadth coincides with that of the inner port 42. At maximum boost and maximum engine revolutions, therefore, the ports are completely in register, giving a maximum effective area of the metering orifice, while at low boosts and low engine revolutions, only the corners of the ports will overlap, thus rendering the effective area of the metering orifice very small.

At the left hand side of the metering unit 11, the inner valve 44 has an axial slot of constant width over its effective length, one edge of which slot is defined by the line 145, and the outer valve 43 has a circumferential slot 146 of constant depth, these two slots registering to provide an exit orifice of constant area for all positions of relative adjustment of the two valves.

If the port 42 in the inner valve 44 is of rectangular form with parallel sides, the effective area of the metering orifice will be varied in accordance with the square of engine speed. If it is desired that the effective area of the orifice should be a linear function of engine speed, or if the engine has a varying volumetric efficiency, so that the required fuel flow is a modified linear function of engine speed, or again if varying mixture strengths are required at varying speeds, then the slope and shape of the inner port 42 can be shaped to give the required result (as later described with reference to Fig. 2), The vane type servo motor 46 (see Figs. 3 and 4) is of the kind having a vane 47 rotatable in a housing 48 containing the operating fluid, and carrying a sleeve 49 surrounding a scroll valve 50 for controlling the operation of the motor. This scroll valve has four spiral grooves cut in it separated by lands 53, one pair of opposite grooves 51 being closed at the upper end of the valve and open at the lower end to an exhaust outlet 52, while the other two grooves 54 are closed at the lower end of the valve and open at the upper end to a pressure inlet 55. The sleeve 49 attached to the vane has ports 56, 57, cooperating with and normally closed by the lands 53 on opposite sides of one of the pressure grooves 54 (see Fig. 4) and communicating with the chamber on opposite sides of the vane. When therefore the scroll valve is displaced, either longitudinally or by rotation thereof, one of these ports will be connected to a pressure groove and the other to an exhaust groove, whereupon the vane will be rotated until the ports are again closed by the lands between the grooves. The outer cylindrical valve 43 of the metering unit 11 is connected to an extension 156 of the sleeve 49 so as to turn with the vane 47.

Longitudinal displacement of the scroll valve 50 is governed by the length of a capsule connected at its lower end to an extension 77 of the scroll valve and urged upwardly by a spring 58. This capsule is of the composite type and the lower part 59 of it is evacuated in the normal way, the upper part 60 being connected internally to the exhaust back pressure by a pipe 61 communicating with the exhaust pipe 62. The ratio between the evacuated and back pressure parts of the capsule determines the influence of back pressure on the length of the capsule stack, and consequently on fuel flow. This ratio is to be determined experimentally for each engine type. In engines which have a fairly open exhaust system, I may connect the non-evacuated portion of the composite capsule to the surrounding air instead of to exhaust back pressure.

The datum position of this capsule stack is variable by means of the expansion of a temperature sensitive Bourdon tube 63, the expansion of which moves the capsule by means of a pivoted lever 64, connected at one end to the Bourdon tube and having its other end resting on top of the capsule. The capsule is housed in a chamber 65 subjected by a pipe 66 to the pressure in the induction system selected as the basis for metering the fuel. It is usual to select the boost pressure for this purpose and further description will be on the assumption that, as illustrated, boost pressure is used in this case. Thus pipe 66 communicates with the induction pipe 22 on the pressure side of the supercharger 67 and the Bourdon tube is connected via its capillary tube 68 to a thermometer bulb 69 measuring boost temperature. Any increase in boost will cause the capsule to shorten and reduction in temperature will cause the datum of the capsule to move upwards and move extension 77 away from the servo motor. Such movement will also carry the scroll valve bands 53 away from the ports 56 and 57 and this will allow the passage of fluid under pressure to one side of the servo vane and cause it to rotate until the scroll valve again becomes sensitive.

The arranged fuel pump 10 can be adapted, to drive the governor weights 45 and the fuel can be utilized as the motive fluid for the vane type servo motor 46.

If this arrangement illustrated is used in conjunction with a variable datum boost control, of the kind described in British specification No. 419,113, there need only be one connection (i. e. link 29) between the boost control and the metering unit to operate the slow-running valve 27 and accelerator pump 32. This single connection could also be designed to operate, if required, the cam 25 controlling the spring loading on the diaphragm of the pressure regulating valve.

The arrangement shown in Fig. 2 is generally similar to that of Fig. 1, but in this case enrichment of the mixture at climb and take-off is provided by shaping the port 41 in the outer valve 43 as indicated at 70. The edge 71 of the port 42 in the inner valve 44 is of non-linear form as shown to adjust the fuel flow so as to provide a desired departure from the square law relationship with engine speed provided by the governor weights 45.

The change of mixture strength from "normal" to "weak" cruising is made, in this case, by rotating the scroll valve 50 by means of a lever 72 attached to the extension 77 and operated by an appropriate linkage from the pilot's lever. This will also cause the servo vane to rotate, and so effect the required adjustment in the mixture strength.

In the arrangement shown in Fig. 5, the effective area of the metering orifice 73 is controlled by a needle valve 74. This arrangement is suitable for cases in which it is desired to make the fuel flow a function of the product of boost and engine revolutions, which result is achieved by a multiplying linkage comprising a slotted link 75, pivoted at 76 to the rod 77 which is adjusted axially by the capsule and engaged by a pair of pins, one 78 fitted to the stem of the needle valve 74 and the other 79 connected to the cranked end of a rod 80 which is moved axially by the governor weights 45. The square law relationship between fuel flow and engine speed obtained from the governor weights is reduced to a linear relationship by means of a cam track 81 formed in the end of the rod 80 and engaged by a pin 82 on a rod 83 which is moved axially by the governor weights.

Variations in mixture strength for different running conditions are provided, in this instance, by a cam 84 operating, under the control of the pilot's throttle lever, to vary the datum of the Bourdon tube 63 associated with the capsule. This expedient could of course be adopted, in the case of the arrangement of Fig. 1, instead of using the cam 25 to vary the mixture strength. Again, in the case of Fig. 5, the mixture strength could be adjusted, as in Fig. 1, by linking to the pilot's throttle lever the cam 25 controlling the spring 23 associated with the diaphragm 15 of the pressure regulating valve 12, in which case mixture strength would be adjusted by variation of the pressure difference across the metering orifice.

This cam 25 can also fulfill other useful functions. Thus, where, under certain conditions it is desired to reduce the flow of petrol to the engine and introduce a proportion of methanol and water, the cam can be arranged, by linking it to the pilot's throttle lever, to effect the desired reduction in the flow of petrol, by reducing the pressure difference across the orifice at the appropriate position of the pilot's lever. Also an extra rich mixture for a limited time at the take-off could be provided by means of a time switch arranged to operate this cam.

It will be appreciated that the invention provides a fuel-metering system such that the varying factors requiring consideration, e. g. temperature and pressure of the air, or air fuel mixture, measured at some point in the induction system, the speed of the engine and the absolute pressure outside the cylinder at the exhaust, can be followed empirically according to what is found necessary in the first place on engine test.

What I claim as my invention and desire to secure by Letters Patent is:

1. In a fuel-metering device for an internal combustion engine, the combination with a variable area fuel-metering orifice, and a pump for delivering fuel through said orifice to the engine, of means for maintaining across said orifice a fluid pressure difference which is independent of engine speed, and means responsive to changes in engine speed for varying the effective area of said orifice as a desired function of engine speed.

2. In a fuel-metering device for an internal combustion engine, the combination with a variable area fuel-metering orifice, and a pump for delivering fuel through said orifice to the engine, of means for maintaining across said orifice a fluid pressure difference which is constant under all conditions of engine loading, and means responsive to changes in engine speed for varying the effective area of said orifice as a desired function of engine speed.

3. In a fuel-metering device for an internal combustion engine, the combination with a variable area fuel-metering orifice, and a pump for delivering fuel through said orifice to the engine, of means for maintaining across said orifice a fluid pressure difference which is independent of engine speed, means responsive to changes in engine speed for varying the effective area of said orifice as a desired function of engine speed, and means for providing a further change in the effective area of said orifice to compensate for variations in induction pipe pressure.

4. In a fuel-metering device for an internal combustion engine, the combination with a variable area fuel-metering orifice, and a pump for delivering fuel through said orifice to the engine, of means for maintaining across said orifice a fluid pressure difference which is independent of engine speed, and an engine-driven centrifugal governor arranged to vary the area of said orifice as a desired function of engine speed.

5. A fuel metering device for an internal combustion engine, comprising a pair of nested cylindrical valves having overlapping ports defining a variable area fuel-metering orifice, a pump for delivering fuel through said orifice to the engine, means for maintaining across said orifice a fluid pressure difference which is independent of engine speed, means responsive to changes in engine speed for effecting longitudinal movement of one of said valves to vary the effective area of said orifice as a desired function of engine speed and means for effecting rotation of the other of said valves in response to changes in induction pipe pressure, and thereby varying the effective area of said orifice as a desired function of induction pipe pressure.

6. A fuel-metering device for an internal combustion engine, comprising a pair of nested cylindrical valves having overlapping ports defining a variable area fuel-metering orifice, a pump for delivering fuel through said orifice to the engine, means for maintaining across said orifice a fluid pressure difference which is independent of engine speed, an engine driven centrifugal governor linked to one of said valves and arranged to effect longitudinal movement thereof in response to changes in engine speed, and a capsule exposed to induction pipe pressure and arranged to effect rotation of the other of said valves in response to changes in induction pipe pressure and thereby to vary the effective area of said orifice as a desired function of induction pipe pressure.

7. A fuel metering device as claimed in claim 6 in which the capsule includes a section exposed to exhaust back pressure.

8. A fuel metering device as claimed in claim 6, which includes a device for displacing the capsule, on variation in induction temperature, and thereby adjusting the effective area of said orifice to suit said variation.

9. A fuel metering device as claimed in claim 6, which includes a vane type servo motor having a scroll valve and rotary servo vane, the scroll valve being arranged to move longitudinally under the control of the capsule and the servo vane being arranged to communicate rotary movement to the valve.

10. In a fuel metering device for an internal combustion engine, the combination with a variable area fuel metering orifice, and a pump for delivering fuel through said orifice to the engine, of a pressure regulating valve for controlling the flow of fuel through said orifice, a diaphragm exposed to the pressure difference across the orifice and linked to said valve, a spring acting on said diaphragm, in opposition to said pressure difference, and means responsive to changes in engine speed for varying the effective area of said orifice as a desired function of engine speed.

11. A fuel metering device as claimed in claim 10, comprising a pilot's throttle lever, and a cam linked to said lever and arranged to adjust the compression of said spring and thereby to vary the pressure difference across said orifice in accordance with the setting of said lever.

12. In a fuel metering device for an internal combustion engine, the combination with a variable area fuel-metering orifice, and a pump for delivering fuel through said orifice to the engine, of means for maintaining across said orifice a fluid pressure difference which is independent of engine speed, a needle valve for controlling the area of said orifice, an engine-driven centrifugal governor, a capsule exposed to induction pipe pressure, and a linkage connecting the governor, the capsule and the needle valve for varying the effective area of said orifice and thereby adjusting the fuel flow to the engine to suit changes in engine speed and in induction pipe pressure.

13. A fuel metering device as claimed in claim 12, wherein said linkage comprises a slotted link, a pin on the needle valve engaging the slot in said link, a rod pivoted to said link and arranged to move axially under the control of said capsule, a second pin engaging the slot in said link and a rod carrying said second pin and arranged to move, under the control of the governor, in a direction transversely to the length of the rod controlled by the capsule.

14. A fuel metering device as claimed in claim 12, wherein said linkage comprises a slotted link, a pin on the needle valve engaging the slot in said link, a rod pivoted to said link and arranged to move axially under the control of said capsule, a second pin engaging the slot in said link and a rod carrying said second pin and arranged to move, under the control of the governor and in linear relationship with changes in engine speed, in a direction transversely to the length of the rod controlled by the capsule.

PHILIP HAROLD STOKES.

REFERENCES CITED

The following references are of record in the file of this patent:

UNITED STATES PATENTS

| Number | Name | Date |
| --- | --- | --- |
| 2,008,143 | Mock | July 16, 1935 |
| 2,330,650 | Weiche | Sept. 28, 1943 |
| 2,324,599 | Schorn | July 20, 1943 |

FOREIGN PATENTS

| Number | Country | Date |
| --- | --- | --- |
| 429,682 | Great Britain | June 4, 1935 |